United States Patent Office 3,445,244
Patented May 20, 1969

3,445,244
SOLID VINEGAR
Peter Paul Noznick, Evanston, and Charles W. Tatter, Homewood, Ill., assignors to Beatrice Foods Co., Chicago, Ill., a corporation of Delaware
No Drawing. Filed Feb. 16, 1966, Ser. No. 527,729
Int. Cl. C12j 1/00
U.S. Cl. 99—147                9 Claims

ABSTRACT OF THE DISCLOSURE

Aqueous vinegar is spray dried with a carbohydrate gum or dextrin as an enrobing agent. Gelatin or gluten can also be present.

---

The present invention relates to spray drying vinegar.

It is an object of the present invention to form spray dried vinegar.

Another object is to entrap the characteristic vinegar flavor in a dry powder.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by spray drying vinegar in the presence of an enrobing agent.

The preferred enrobing agent is gum arabic. In place of all or part of the gum arabic there can be used dextrin as a coating or enrobing agent. Also, there can be used other carbohydrate gums such as gum tragacanth.

There can also be used certain proteins in conjunction with the gum arabic and/or dextrin. Thus, there can be employed A type gelatin and gluten (the acid soluble protein from wheat).

Optionally, there can be added fats and/or emulsifiers, e.g. mono and di glycerides to (1) absorb fat soluble flavors, (2) prevent dusting of the final powder and (3) to cut down foaming during processing. Suitable fats include vegetable fats such as cocoanut oil, hydrogenated castor oil, hydrogenated cottonseed oil, corn oil, safflower oil, peanut oil.

The vinegar can be from 60 grain to 500 grain, with 200–400 grain vinegar (i.e. 20–40%) being preferred. It is not economically feasible to use vinegar below 60 grain because of the large amount of water which must be removed.

The spray dried vinegar products of the present invention can be used to impart vinegar flavor in dry form for salad dressings, sour cream, spaghetti sauce, dry mix preparations, etc.

Unless otherwise indicated, all parts and percentages are by weight.

Usually the aqueous mixture which is spray dried has 25–60% solids (i.e. nonwater) content. It is preferred to use as high a solids concentration as is possible so as to keep the drying rate at a maximum and the resultant powder at the lowest temperature. The solids content prior to drying should be such as to give a fluid, homogenous emulsion.

The range of proportions of materials which can be employed are as follows:

|  | Percent |
|---|---|
| Vinegar (nonaqueous basis) | 5 to 60 |
| Gum acacia | 25 to 95 |

When dextrin is employed it is used in an amount of 30 to 95% of total solids. Gelatin, when employed, is used in an amount of 2 to 20%. Fats, when employed, are used in an amount of 0.1 to 10%. Mono and di glycerides are used in the same amount as the fats.

The aqueous mixture of gum or dextrin is normally pasteurized, e.g. at 140–165° F.

Preferably, the vinegar is not added to the hot gum or dextrin solution or volatile materials will be lost. The temperature therefore is preferably lowered to not over 125° F., most preferably at 100–120° F. prior to addition of the vinegar. The emulsion should be well homogenized to entrap the vinegar flavor. Homogenization pressures are usually in the range of 1000–5000 p.s.i.

When employing dextrin it is important to keep the contact time between the aqueous acid and dextrin at a minimum to prevent hydrolysis.

Example 1

|  | Parts |
|---|---|
| White vinegar solids | 20 |
| Gum acacia | 80 |

In the above example the method of preparation was as follows: Gum acacia was dissolved in enough warm water to give a 35% total aqueous solids suspension after addition of the vinegar. (The term solids as used in the present specification when applied to vinegar includes all the nonaqueous portion of the vinegar.) The gum acacia solution was pasteurized at 160° F. for 30 minutes, cooled to 125° F. and concentrated (300 grain) white vinegar added. The batch was stirred until uniform, homogenized at 2000 p.s.i. and spray dried in a horizontal concurrent flow spray dryer at 350° F.

A similar spray dried product was obtained by replacing the white vinegar by cider vinegar.

Example 2

|  | Parts |
|---|---|
| White vinegar solids | 50 |
| Gum acacia solids | 50 |

The process of Example 1 was repeated to produce a spray dried vinegar enrobed in the gum acacia.

Example 3

|  | Parts |
|---|---|
| White vinegar solids | 20 |
| Gum acacia | 65 |
| Gelatin type A | 15 |

The process of Example 1 was repeated to produce a spray dried vinegar product.

Example 4

|  | Parts |
|---|---|
| White vinegar solids | 20 |
| Globe yellow dextrin | 80 |

The procedure of Example 1 was repeated to obtain spray dried vinegar enrobed in the dextrin.

Example 5

|  | Parts |
|---|---|
| White vinegar solids | 50 |
| Globe yellow dextrin | 50 |

The procedure of Example 1 was repeated to obtain spray dried vinegar enrobed in the dextrin.

Example 6

|  | Parts |
|---|---|
| White vinegar solids | 20 |
| Globe yellow dextrin | 65 |
| Gelatin, type A | 15 |

The procedure of Example 1 was repeated to obtain spray dried vinegar enrobed in a mixture of dextrin and gelatin.

We claim:

1. A composition comprising 5 to 60% spray dried vinegar enrobed in a spray dried member of the group consisting of 25 to 95% carbohydrate gums and 30 to 95% dextrin.

2. A product according to claim 1 including 2 to 20% of a member of the group consisting of gelatin and gluten.

3. A product according to claim 1 containing 5 to 60% vinegar and 25 to 95% gum acacia.

4. A product according to claim 3 including 2 to 20% of gelatin.

5. A product according to claim 1 containing 5 to 60% vinegar and 30 to 95% dextrin.

6. A product according to claim 5 including 2 to 20% gelatin.

7. A process of preparing the product of claim 1 comprising passing an aqueous mixture containing 25 to 60% solids of vinegar and an enrobing agent of the group consisting of carbohydrate gums and dextrin wherein the solids comprise 5-60% vinegar and 25-95% of the enrobing agent at a temperature of not over 125° F. to a spray drier and spray drying the mixture.

8. A process according to claim 7 including the step of homogenizing the aqueous mixture prior to spray drying.

9. A process according to claim 8 wherein the enrobing agent is gum acacia.

References Cited

UNITED STATES PATENTS

| 1,800,501 | 4/1931 | Bornegg | 99—206 |
| 2,953,457 | 9/1960 | Sanna | 99—56 |

FOREIGN PATENTS 23,064  10/1963  Japan.

RAYMOND N. JONES, *Primary Examiner.*

R. B. ANDEWELT, *Assistant Examiner.*

U.S. Cl. X.R.

99—199